United States Patent
Dho

(10) Patent No.: US 6,865,309 B2
(45) Date of Patent: Mar. 8, 2005

(54) OPTICAL COUPLING DEVICE, METHOD OF PRODUCING THE SAME, AND OPTICAL APPARATUS USING THE SAME

(75) Inventor: Sang-whoe Dho, Gyunggi-do (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 175 days.

(21) Appl. No.: 10/283,194

(22) Filed: Oct. 30, 2002

(65) Prior Publication Data

US 2003/0091279 A1 May 15, 2003

(30) Foreign Application Priority Data

Nov. 10, 2001 (KR) ........................................ 2001-69960

(51) Int. Cl.[7] ............................... G02B 6/26; G02B 6/42
(52) U.S. Cl. ......................... 385/15; 385/39; 385/116; 385/119; 372/6; 359/27; 359/855; 353/31
(58) Field of Search ........................... 385/15, 27, 39, 385/116, 119, 121, 133, 147; 372/6; 359/27, 850, 855, 872, 877; 353/31

(56) References Cited

U.S. PATENT DOCUMENTS

| | | | |
|---|---|---|---|
| 5,700,076 A | * 12/1997 | Minich et al. | 353/31 |
| 6,426,781 B1 | * 7/2002 | Lee | 348/754 |
| 6,437,816 B1 | * 8/2002 | Fujita et al. | 347/233 |
| 6,636,339 B2 | * 10/2003 | Lee | 359/202 |

\* cited by examiner

*Primary Examiner*—Akm Enayet Ullah
*Assistant Examiner*—Daniel Petkovsek
(74) *Attorney, Agent, or Firm*—Sughrue Mion, PLLC

(57) ABSTRACT

An optical coupling device, a method of producing the same, and an optical apparatus using the same. A light transmitting medium of the optical coupling device is made of optical fibers to transmit the light. Three RGB laser beams can be compounded by forming one output end after heating one end of the optical fibers. Input ends of the optical fibers each have a lens to collimate each laser beam. A collimating lens installed at an output end of the optical fibers changes the compounded laser beam to a parallel ray. The optical coupling device made of the optical fibers can be applied to an image reproducing apparatus such as a projector and a projection TV. Especially, when the optical coupling device using the optical fibers is applied to an image reproducing apparatus having a DMD (digital micro-mirror device), the size of the image reproducing apparatus can be reduced and the quality of the image reproduced is improved.

5 Claims, 5 Drawing Sheets

OPTICAL COUPLING DEVICE, METHOD OF PRODUCING THE SAME, AND OPTICAL APPARATUS USING THE SAME

BACKGROUND OF THE INVENTION

1. Field of the Invention

The present invention relates to an optical coupling device, a method of producing an optical coupling device, and an optical apparatus using the same, and, more particularly, to an optical coupling device to form a compound laser beam having RGB information by using optical fiber, a method of producing an optical coupling device, and an optical apparatus using the same.

This application is based on Korean Patent Application No. 2001-69960 filed on Nov. 10, 2001, the disclosure of which is incorporated herein by reference in its entirety.

2. Description of the Related Art

A projector forms an image by projecting an input image signal onto a screen. The projector is used for a presentation in a meeting room, projection in a cinema, and realization of a home theater. More recently, an LCD (liquid crystal display) is mostly used for a projector, and sometimes a CRT (cathode ray tube) is used.

A flat plate device such as an LCD or a CRT is a representative means for image displaying. A conventional method for realizing a mega screen is to project an image shown on the LCD or the CRT onto a screen, after the image is enlarged by a lens. However, since only the image is enlarged, the picture quality of the image is poor. To solve the above-described problem, a projector having a DMD (digital micro-mirror device) has gradually come into use.

The DMD is a semi-conductive optical switch using a micro-mirror. The micro-mirror controls the reflection of the light in accordance with an input image signal. The DMD uses a digital method, thus the color re-productivity of the image signal is good and the brightness is also high. Moreover, A/D or D/A conversion is not required, so a clear image is realized. In addition, the DMD has no loss in the light generated by a Polaroid filter, and thus high optical output can be obtained.

FIG. 1 is a block diagram showing a basic structure of an image projecting apparatus using a conventional laser. Referring to FIG. 1, the conventional image projecting apparatus (hereinafter referred to as 'projector') has a laser beam light source 100, an optical system 110, a light separation unit 120, a light modulation unit 130, a light composition unit 140, and a light scanning unit 150. Light passage of the light source 100 is expressed as one-dotted chain line in FIG. 1.

The light source 100 generates a white light laser beam or laser having the respective colors of red, green and blue. The optical system 110 has a first high reflective mirror 112 for changing the passage of the laser beam generated at the light source 100. The optical system 110 also has a first collimating lens 114 for converting the laser beam to a parallel ray, and a first and a second micro lens, 116 and 118 respectively, for adjusting the magnitude of the parallel ray. The first micro lens 116 with a long focal distance is installed at the front end of the optical system 110 and the second micro lens 118 with a short focal distance is installed at the rear end of the optical system 110.

The laser beam that has been transformed into the parallel ray by passing through the first collimating lens 114 is reduced as much as the magnification rate of the first and the second micro lenses, 116 and 118, as the laser beam passes through the lenses 116 and 118. When the magnitude of the laser beam is reduced, the light can be effectively modulated at an AOM (acousto-optic modulator) 134.

The light separation unit 120 includes a first and a second dichroic mirrors 122 and 124, and a second high reflective mirror 126. The light separation unit 120 separates the laser beam incident from the first and the second micro lenses 116 and 118 into a monochromatic light such as red, green and blue. The first dichroic mirror 122 reflects over 99% of blue light and transmits red and green light. The second dichroic mirror 124 reflects over 99% of green light and transmits red light. The second high reflective mirror 126 reflects red light. If an individual laser beam with respect to the monochromatic light such as red, green and blue is generated at the light source 100, then the light separation unit 120 can be excluded.

A focusing lens 132 is installed at a front end of the light modulation unit 130. The focusing lens 132 collimates the laser beam separated into three monochromatic lights at the light modulation unit 130. The light modulation unit 130 uses the same modulator with the AOM 134. The AOM 134 processes signals quickly when the diameter of the passing through laser beam is small. In other words, the focusing lens 132 collimates the laser beam so that the AOM 134 can effectively process the optical signal.

The light composition unit 140 has a second collimating lens 142, a fourth and a fifth dichroic mirrors 144 and 146, and a third high reflective mirror 148. The second collimating lens 142 restores the laser beam that has been optically modulated at the AOM 134 to a laser beam of the initial parallel ray. The fourth and the fifth dichroic mirrors 144 and 146 compound the modulated red, green, and blue light into a white light laser beam. The third high reflective mirror 148 changes the light passage of monochromatic light.

The light scanning unit 150 scans the compounded laser beam horizontally and vertically. The scanned laser beam forms an image on the screen 170 after passing through a projection lens 160. The projection lens 160 forms a clear image by enlarging the laser beam with image information.

However, the dichroic mirror used to form a compound of the separated monochromatic light should be arranged accurately and exactly to transmit the laser beam. In addition, the dichroic mirror takes a lot of space in a projector, thus it is difficult to make the projector small.

Moreover, the dichroic mirror has been used to selectively transmit or reflect the laser beam when the wavelength of the laser beam is different. Yet, when the wavelength of the laser beam is the same, a more complicated structure was required. To form a compound laser beam having the same wavelength, a polarized light device is used. The polarized light device is a device to selectively transmit or reflect vertical polarized light and horizontal polarized light. When a laser beam without polarized light is projected, the polarized light device requires a complicated structure such as a polarizer to polarize the laser beam and a polarization rotation device to rotate the polarized light.

SUMMARY OF THE INVENTION

The present invention has been made to overcome the above-described problems in the prior art. Accordingly, it is an aspect of the present invention to provide an optical coupling device capable of coupling three monochromatic beams that are modulated without the use of dichroic mirror that combines three monochromatic beams. To further solve the above-described problems, it is an aspect of the present invention to provide a method for manufacturing the optical coupling devices.

Another aspect of the present invention is to provide optical equipment using the optical coupling device.

The above aspects of the present invention are accomplished by providing an optical coupling device, including a light transmitting medium having a plurality of input ends and one output end; a first lens installed at each of the input ends of the light transmitting medium to collimate an input light; and a second lens installed at the output end of the light transmitting medium to transmit the input light and to compound the input light into one parallel ray.

The light transmitting medium is an optical fiber, and the second lens is a collimating lens.

The above aspect of the present invention is also accomplished by a method of producing an optical coupling device comprising the steps of: forming one output end by heating an end of a plurality of optical fibers; and connecting a first lens with an input end of the optical fibers and a second lens with the output end.

The step of forming the output end includes the steps of: bounding a point placed at a certain distance from the input end of the plurality of optical fibers and heating; and extending the heated one end of the optical fibers.

The step of forming the output end further includes the step of polishing the output end. The second lens is a collimating lens.

According to the optical coupling device, the method of producing the optical coupling device, and the optical apparatus using the same, as the optical fiber to transmit the light is used, the magnitude of a means to form a compound of the three separated laser beams can be reduced. Moreover, not a lot of space is required for installation of the optical coupling device using the optical fiber; thus, the size of the image projector can be reduced.

The other aspect of the present invention is to provide an optical apparatus using an optical coupling device, comprising: a light generation unit to output a light; a light composition unit made of a plurality of optical fibers and the light composition unit being operative to compound the light input from the light generation unit; and a light scanning unit to form an image by projecting the compounded laser beam onto a screen.

The light generation unit comprises: a light source to release the laser beam; a light separation unit to separate the released laser beam into monochromatic lights having different wavelengths; and a light modulation unit to modulate the separated monochromatic lights according to each wavelength.

The light composition unit comprises: a light transmitting medium having a plurality of input ends and one output end; a first lens installed at each of the input ends of the light transmitting medium to collimate an input light; and a second lens installed at the output end of the light transmitting medium to transmit the input light and to compound the input light into one parallel ray.

The second lens is a collimating lens. The light scanning unit scans the monochromatic lights onto a screen vertically and horizontally.

According to the present invention, an optical apparatus using an optical coupling device according to the present invention includes a light source to release a plurality of laser beams having different wavelengths; a light composition unit made of a plurality of optical fibers and the light composition unit being operative to compound the laser beam input from the light source; a square beam generation unit to generate the compounded laser beam into an equal square shape; and a DMD (digital micro-mirror device) panel to reflect the laser beam that has been changed to square for a predetermined angle.

The light composition unit comprises: a light transmitting medium having a plurality of input ends and one output end; and a lens unit installed at each of the plurality of input ends of the light transmitting medium, the lens being operative to collimate the laser beam to the light transmitting medium. The light source outputs the laser beam intermittently.

Further provided is a light selection unit to select the laser beam input from the light source for its wavelength and output the selected laser beam to the light composition unit. The light selection unit is a rotatable wheel and some part of the wheel is cut in an arc shape having a predetermined angle with respect to a radius thereof, and the laser beam passes through the cut portion.

According to the present invention, by either directly releasing laser beam under on/off control, or by using a light discriminating means such as a wheel, the optical apparatus such as laser projector can be compact-sized. Further, as the laser beam can be transmitted and combined through the use of optical fiber, interior of the optical apparatus can also be compact-sized.

BRIEF DESCRIPTION OF THE DRAWINGS

The above-described aspects and features of the present invention will be more apparent by describing the illustrative, non-limiting embodiments of the present invention by referring to the appended drawings, in which.

DESCRIPTION OF THE ILLUSTRATIVE, NON-LIMITING EMBODIMENTS

Hereinbelow, the present invention will be described in greater detail by referring to the appended drawings.

Figure 1:
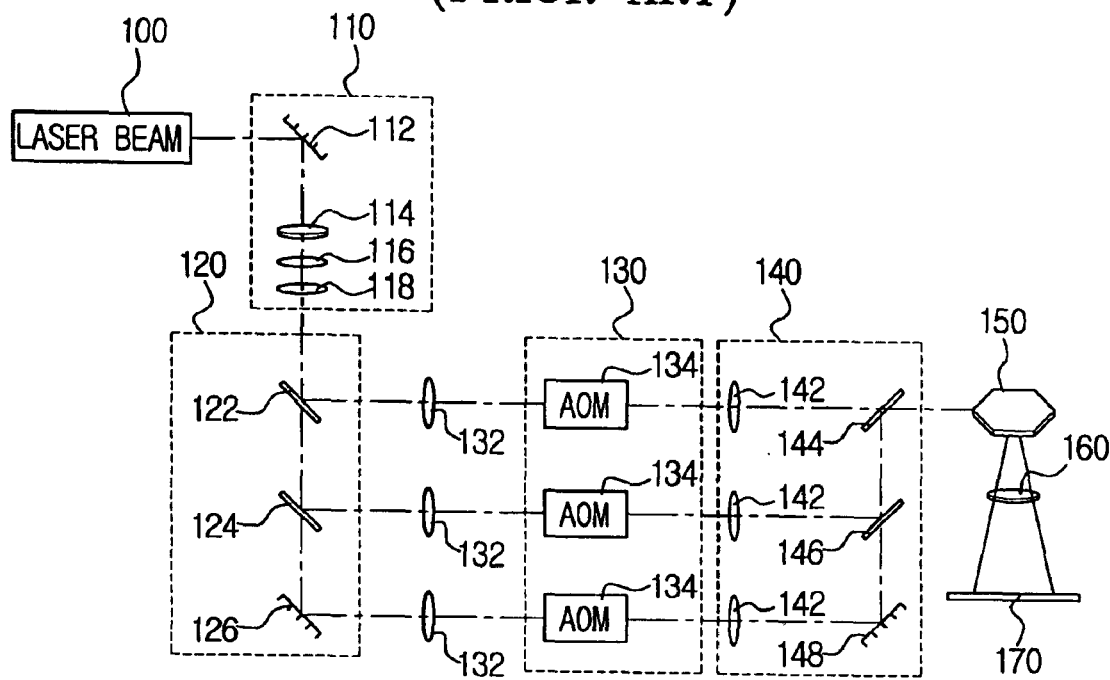
FIG. 1 is a view showing a basic structure of an image projecting apparatus using a conventional laser.
Figure 2:
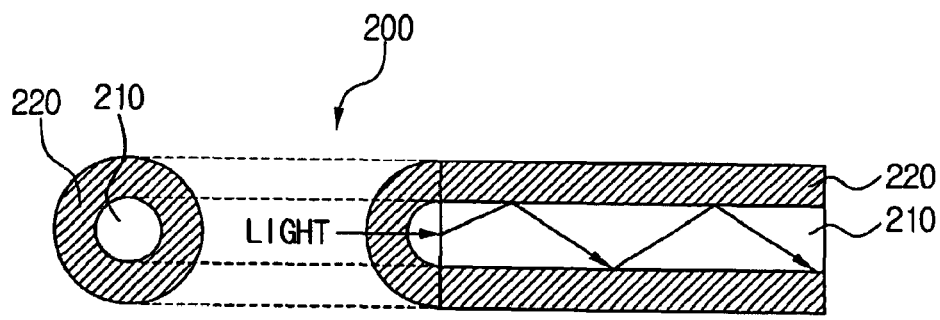
FIG. 2 is a view showing a basic structure of an optical fiber used in the present invention.

FIG. 2 is a view showing a basic structure of an optical fiber used in the present invention. Referring to FIG. 2, the optical fiber 200 has a core 210 and a clad 220.

The optical fiber 200 is a fiber made using a transparent dielectric substance such as quarts glass and plastic. The most widely used is a silicon oxide ($SiO_2$) optical fiber, which has a thickness of a hair. The refractive index of the clad 220 is less than that of the core 210. Therefore, the light projected to the core 210 passes through the core 210 without any loss of light because the light is repeatedly and totally reflected at the boundary of the core 210 and the clad 220, as shown in FIG. 2.

Figure 3:
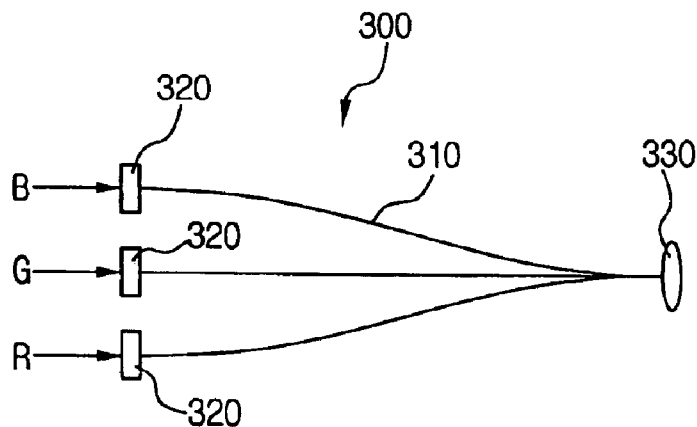
FIG. 3 is a view showing an optical coupling device using the optical fiber according to the present invention.
Figure 4:
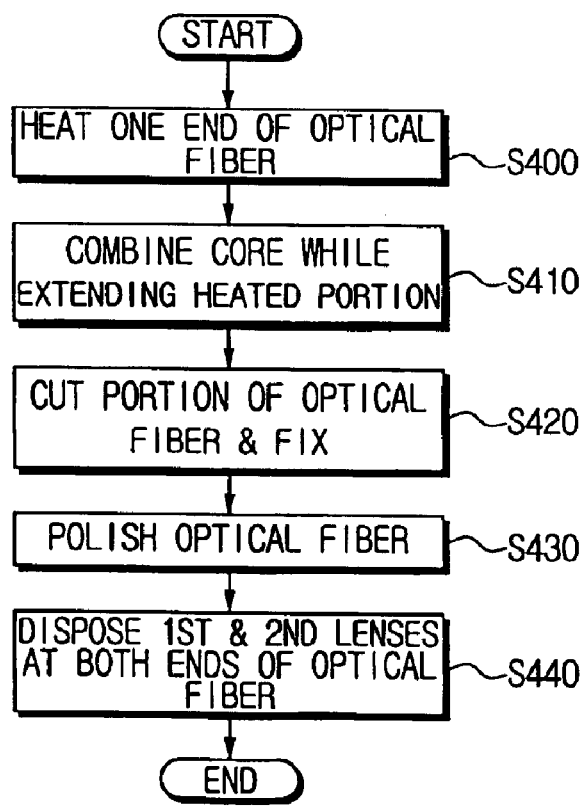
FIG. 4 is a flow chart showing a method of producing the optical coupling device using the optical fiber according to the present invention.

FIG. 3 is a view showing an optical coupling device using the optical fiber according to the present invention, and FIG. 4 is a flow chart showing a method of producing the optical coupling device using the optical fiber according to the present invention.

Referring to FIGS. 3 and 4, the optical coupling device 300 has a light transmitting medium 310, a collimation micro lens 320 and a collimating lens 330. The light transmitting medium 310 is made of the optical fiber and has a plurality of input ends and one output end.

As ends of more than two optical fibers 200 are heated and pulled at the same time (S 400), the cores 210 are combined into a single core and the thickness becomes thinner (S 410). As the cores 210 are combined into one, one output end is formed. The output end of the light transmitting medium 310, where one core 210 is included, is cut, and input and output ends of the light transmitting medium 310 are fixed (S 420). When the light transmitting medium 310 is fixed, the output end is polished (S 430).

Furthermore, the collimation micro lens 320 for collimation is installed at the input ends of the fixed light transmitting medium 310, and the collimating lens 330 is installed at the output end (S 440). The collimation micro lens 320 installed at the input ends collimates laser beam to the light transmitting medium 310. The collimating lens 330 installed at the output end of the light transmitting medium 310 converts the collimated laser beam into a parallel ray. The collimation micro lens 320 can use a condenser lens to collimate the laser beam at a wanted direction.

Figure 5:
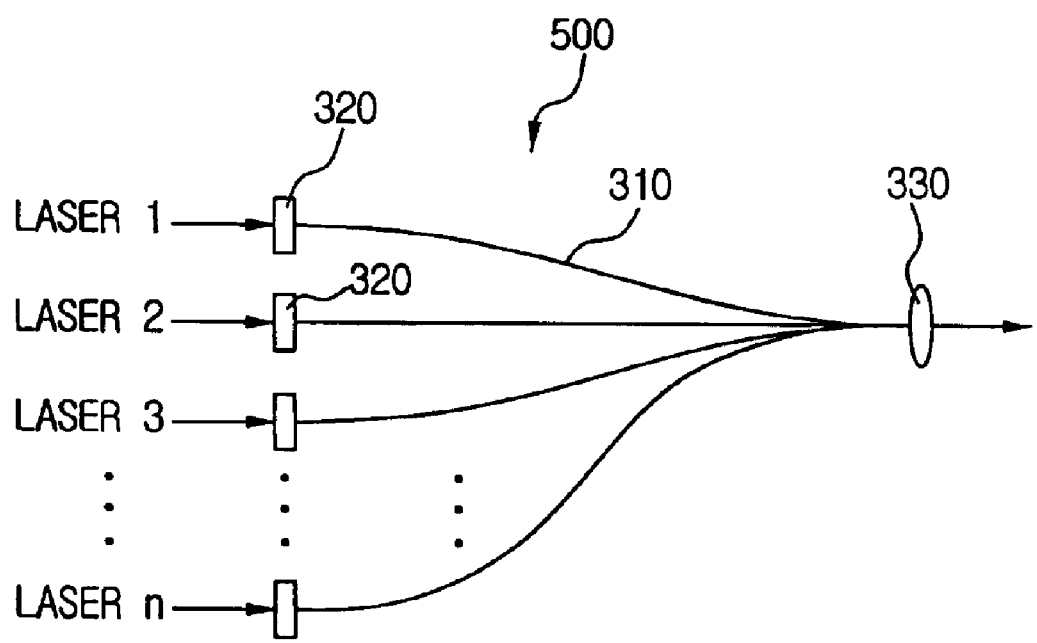
FIG. 5 is a view showing one illustrative, non-limiting embodiment using the optical coupling device according to the present invention.

FIG. 5 is a view showing one illustrative, non-limiting embodiment using the optical coupling device according to the present invention. Referring to FIG. 5, the optical coupling device 500 according to the present invention can compound a laser beam having the same wavelength or lower power. The number of beams that can be compounded is not limited. Accordingly, laser beam having a high power can be generated without using a complicated optical system such as the conventional polarized light device. In addition, the physical magnitude of the optical system can become smaller.

Figure 6:
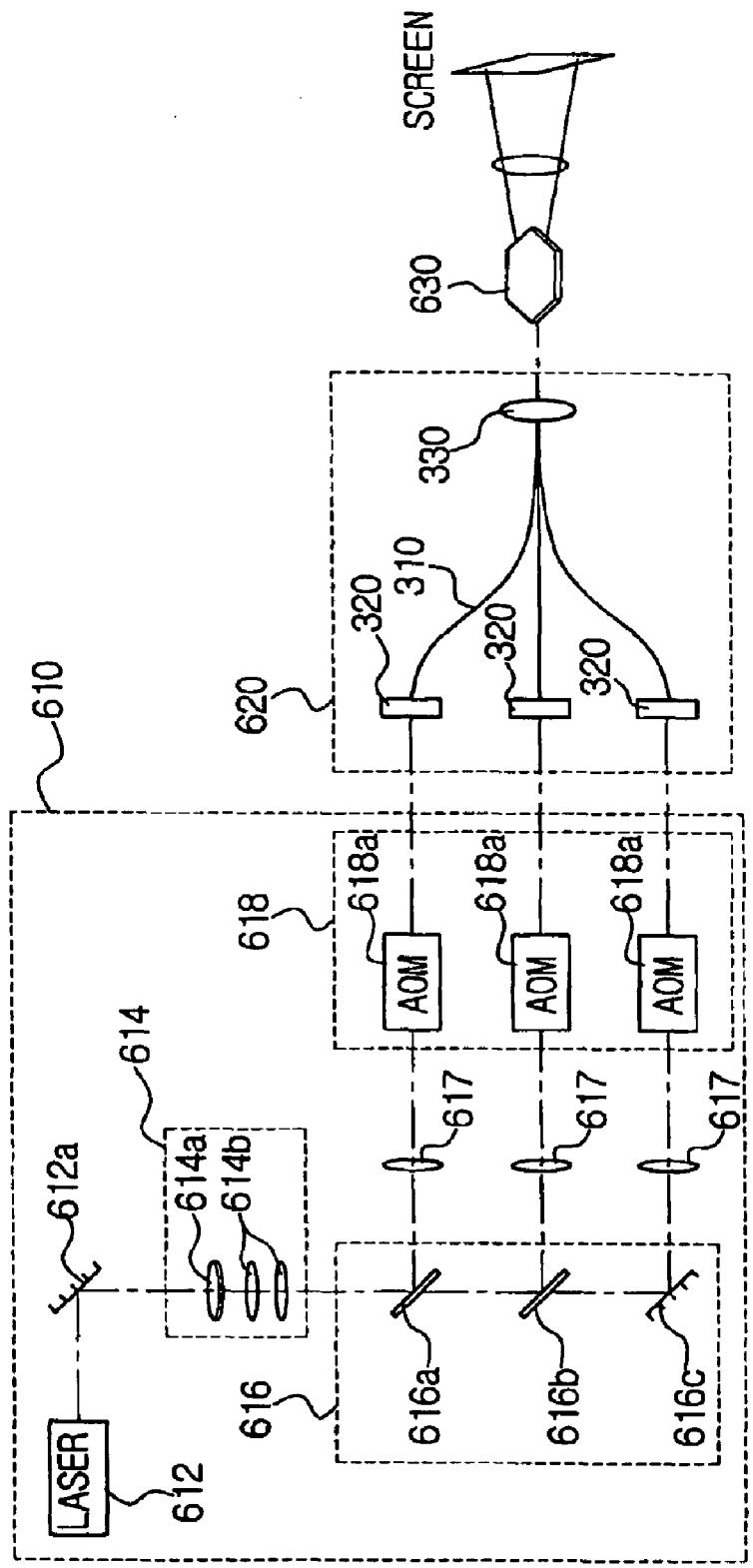
FIG. 6 is a view showing one illustrative, non-limiting embodiment of a laser projector using the optical coupling device according to the present invention.

FIG. 6 is a view showing an illustrative, non-limiting embodiment of a laser projector using the optical coupling device according to the present invention.

Referring to FIG. 6, the laser projector 600 with the optical coupling device according to the present invention has a light generation unit 610, a light composition unit 620, and a light scanning unit 630. In FIG. 6, the light passage of the laser beam is shown as one-dotted chain line.

The light generation unit 610 has a laser light source 612, an optical system 614, a light separation unit 616, and a light modulation unit 618. The light source 612 releases laser beams of red, green, and blue color, respectively, or releases a white light laser beam. A high reflective mirror 612a changes the passage of the laser beam. The optical system 614 has a collimating lens 614a and two collimation micro lenses 614b. The laser beam becomes a parallel ray by passing through the collimating lens 614a, and is reduced as much as the magnification rate of the two collimation micro lenses by passing through the collimation micro lenses 614b.

The reduced laser beam is separated to a monochromatic light such as red, green, and blue at the light separation unit 616. The light separation unit 616 comprises a first and a second dichroic mirrors, 616a and 616b, respectivelly, and a high reflective mirror 616c. The first dichroic mirror 616a reflects over 99% of the blue light, and transmits red and green light. The second dichroic mirror 616b reflects over 99% of the green light, and transmits the red light. The second high reflective mirror 616c reflects the red light.

The separated monochromatic light is collimated by a focusing lens 617 and is optically modulated at the light modulation unit 618. The light modulation unit 618 modulates the separated monochromatic light and outputs the modulated monochromatic light to the light composition unit 620. The light modulation unit 618 uses a modulator such as AOM (acousto-optic-modulator) 618a.

The light composition unit 620 uses the optical coupling device 300 shown in FIG. 3. The three kinds of laser beam modulated at the light modulation unit 618 is collimated at the core 210 of the light transmitting medium 310 through the collimation micro lens 320. Three rays of laser are passed in total reflection through the core 210, and then they are combined at an output end. The compounded laser beam is outputted as a laser beam that has become a parallel ray by passing through the collimating lens 330 at the output end. The laser beam forms an image by being projected onto the screen by the light scanning unit 630. The light scanning unit 630 projects a laser beam by horizontal projection and vertical projection.

Figure 7:
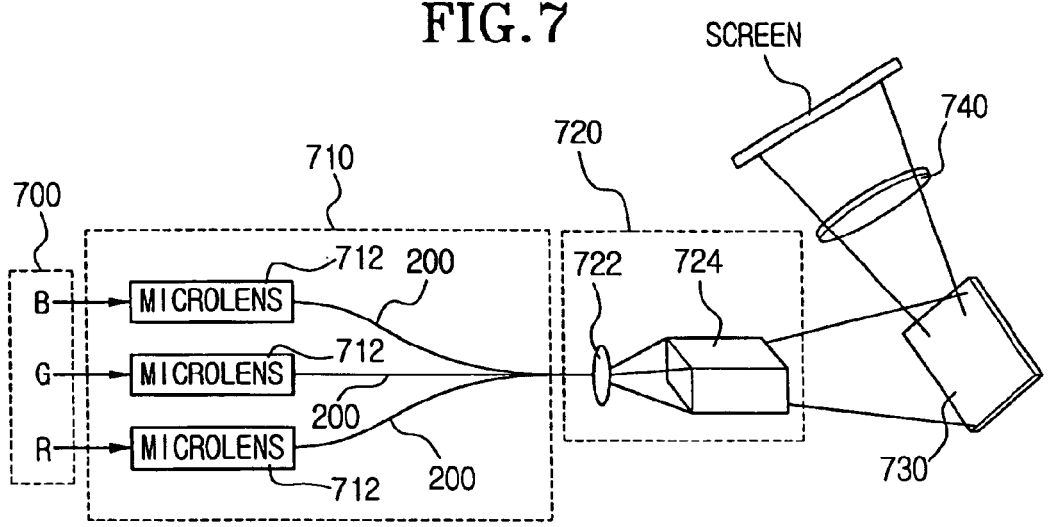
FIG. 7 is a view showing one illustrative, non-limiting embodiment of an optical apparatus using the optical coupling device according to the present invention.

FIG. 7 is a view showing an illustrative embodiment of an optical apparatus using the optical coupling device according to the present invention.

Referring to FIG. 7, the optical apparatus using the optical coupling device has a light source 700, a light composition unit 710, a square beam generation unit 720 and a DMD (digital micro-mirror device) panel unit 730.

The light source 700 is laser beams of red, green, and blue colors, respectively. The laser beam can control the on and off by itself (Table 1). The laser beam having the characteristic of ON is an output to the light composition unit 710. In Table 1, red laser beam having the characteristic of ON is an output to the light composition unit 710 in step 1. Circling one time through steps 1–3 completes an image of one sheet. TV has a high picture quality by displaying an image of 60 sheets by circling 60 times per second.

TABLE 1

| Type | Step 1 | Step 2 | Step 3 |
| --- | --- | --- | --- |
| Red Laser | ON | OFF | OFF |
| Green Laser | OFF | ON | OFF |
| Blue Laser | OFF | OFF | ON |

The light composition unit 710 has the optical fiber 200 with a plurality of input ends and one output end. The light composition unit 710 compounds laser beam input into the optical fiber 200 and generates monochromatic light laser beam at the output end. A collimation micro lens 712 installed at the input ends of the optical fiber 200 collimates each laser beam.

The square beam generation unit 720 transforms the generated monochromatic light laser beam into equal square beams and projects the transformed laser beam to the DMD 730. The square beam generation unit 720 has a lens 722 and a light tube 724. The laser beam output at the output end of the optical fiber 200 is converted into the square beam through the lens 722 and the light tube 724.

The lens 722 disperses the laser beam and projects the laser beam to the light tube 724. Four sides of the inside of the light tube 724 are mirrors. The DMD 730 reflects the laser beam that has been converted to square beam for a predetermined angle. A projection lens system 740 forms the image onto the screen by projecting the reflected laser beam consecutively.

Figure 8:
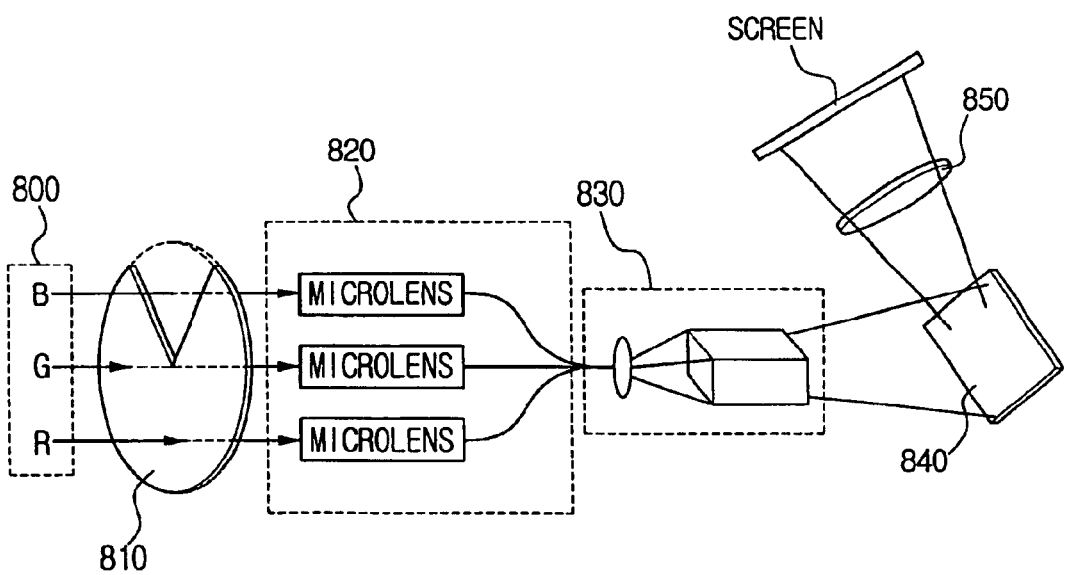
FIG. 8 is a view showing another illustrative, non-limiting embodiment of the optical apparatus using the optical coupling device according to the present invention.

FIG. 8 is a view showing another illustrative, non-limiting embodiment of the optical apparatus using the optical coupling device according to the present invention.

Referring to FIG. 8, the optical apparatus using the optical coupling device according to the present invention has a light source 800, a light selection unit 810, a light composition unit 820, a square beam generation unit 830, and a DMD panel unit 840. The light source 800 is a monochromatic light laser beam of red, green, and blue color, respectively.

The light selection unit 810 transmits the laser beam after selecting the laser beam regarding its wavelength. The light selection unit 810 is a type of rotatable wheel. A part of the wheel is cut as an arc shape with a predetermined angle, and the laser beam passes through the cut portion. The wheel adjusts the rotation speed of the wheel by evaluating an image signal of the laser beam having the red, green, and blue wavelength. The light composition unit 820, the square beam generation unit 830, and the DMD panel unit 840 and a projection lens system 850, all have the same structures and functions with the light composition unit 710, and the square beam generation unit 720, the DMD panel unit 730, and the projection lens system 740 shown in FIG. 7.

In the meantime, hereinbelow, the illustrative embodiment of the optical apparatus using a DLP (digital light processing) method and the optical coupling device according to the present invention will be described. The DLP method uses a digital apparatus to decide the status of ON/OFF of the light reflected from the surface of the DMD. Moreover, the DLP method has a fast responding speed of the element in comparison to a CRT and a PDP, thus the DLP method can form more natural motion pictures. In addition, the DLP method is not influenced at all by terrestrial magnetism and is appropriate for front and rear projection.

When the optical apparatus using the optical fiber and the DLP method is applied to a theater system, simultaneous showing in multiple cinemas can be done through a digital file. Specifically, a header having the DMD panel and the projection lens is installed at every cinema and an apparatus to generate laser beam with the image information is installed at one particular place. An optical connecting apparatus using the optical fiber connects the DMD panel and the laser beam generating apparatus. Therefore, the image projector does not have to be installed at every cinema; thus, the cost and the space for installation can be reduced. Moreover, the DMD panel is produced smaller in size, so it can be installed in a narrower space.

In addition, when an optical apparatus using the optical coupling device is applied to a projection TV like a HDTV, the thickness of the HDTV can be reduced without changes in the picture quality and the picture size. Besides, the optical apparatus using the optical fiber can be used effectively for information display such as public information, facility guiding board of public facilities and various kinds of buildings.

According to the optical coupling device, the method of producing the optical coupling device, and the optical apparatus using the coupling device, as the optical fiber for transmitting the light is used, the magnitude of a means for compounding the separated three laser beams can be reduced. Moreover, the installation of the optical coupling device, which uses the optical fiber, does not require a lot of space; thus, the size of the image projector can be reduced. Additionally, laser beam of the same wavelength can be compounded regardless of the number of laser beams. Accordingly, laser beam having high power can be generated from laser beam having low power. Especially, when the optical coupling device, which uses the optical fiber, is applied to the optical apparatus using the DLP method, utilization of light is enhanced; thus, images of high brightness and accuracy can be formed.

The above and other features of the invention including various and novel details of construction and combination of parts has been particularly described with reference to the accompanying drawings and pointed out in the claims. It will be understood that the particular construction and combination of parts embodying the invention is shown by way of illustration only and not as a limitation of the invention. The principles and features of this invention may be employed in varied and numerous embodiments without departing from the scope of the invention.

What is claimed is:

1. An optical apparatus using an optical coupling device, comprising:

a light source to release a plurality of laser beams having different wavelengths;

a light composition unit made of a plurality of optical fibers, the light composition unit being operative to compound the laser beam input from the light source;

a square beam generation unit to generate the compounded laser beam as an equal square shape; and a digital micro-mirror device panel to reflect the laser beam that has been changed to square for a predetermined angle.

2. The optical apparatus using an optical coupling device of claim 1, wherein the light composition unit includes:

a light transmitting medium having a plurality of input ends and one output end; and a lens unit installed at each of the plurality of input ends of the light transmitting medium, the lens unit being operative to collimate the laser beam to the light transmitting medium.

3. The optical apparatus using an optical coupling device of claim 1, wherein the light source outputs the laser beam intermittently.

4. The optical apparatus using an optical coupling device of claim 1, further comprising a light selection unit to select the laser beam input from the light source for its wavelength and output the selected laser beam to the light composition unit.

5. The optical apparatus using an optical coupling device of claim 4, wherein the light selection unit is a rotatable wheel and some part of the wheel is cut in an arc shape having a predetermined angle with respect to a radius thereof, and the laser beam passes through the cut portion.

* * * * *